(12) United States Patent
Takemoto et al.

(10) Patent No.: US 11,471,965 B2
(45) Date of Patent: Oct. 18, 2022

(54) WIRE DISCONNECTION PREDICTION DEVICE

(71) Applicant: FANUC CORPORATION, Yamanashi (JP)

(72) Inventors: Masanobu Takemoto, Yamanashi (JP); Keita Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 323 days.

(21) Appl. No.: 16/752,717

(22) Filed: Jan. 27, 2020

(65) Prior Publication Data

US 2020/0246894 A1    Aug. 6, 2020

(30) Foreign Application Priority Data

Jan. 31, 2019 (JP) ............................. JP2019-015766

(51) Int. Cl.
| | |
|---|---|
| *G06F 19/00* | (2018.01) |
| *B23H 7/16* | (2006.01) |
| *G06N 20/00* | (2019.01) |
| *B23H 7/20* | (2006.01) |

(Continued)

(52) U.S. Cl.
CPC .............. *B23H 7/16* (2013.01); *B23H 7/20* (2013.01); *G05B 19/182* (2013.01); *G06N 20/00* (2019.01);

(Continued)

(58) Field of Classification Search
CPC ...... H04L 67/10; B23Q 17/098; G06N 20/00; B23H 7/20; B23H 7/16; G05B 19/182; B05B 2219/49015
See application file for complete search history.

(56) References Cited

U.S. PATENT DOCUMENTS

| 5,019,684 A | 5/1991 | Ito |
|---|---|---|
| 2013/0024020 A1 | 1/2013 | Onodera et al. |

(Continued)

FOREIGN PATENT DOCUMENTS

| CN | 103093192 A | 5/2013 |
|---|---|---|
| JP | H1289620 A | 11/1989 |

(Continued)

OTHER PUBLICATIONS

Xia Weiwen et al. "Break-out detection for high-speed small hole drilling EDM based on machine learning", Procedia CIRP, vol. 68, Jan. 1, 2018, pp. 569-574, Elsevier, 6pp.

(Continued)

*Primary Examiner* — Tuan A Vu
(74) *Attorney, Agent, or Firm* — Hauptman Ham, LLP

(57) ABSTRACT

A wire disconnection prediction device includes: a data acquisition part configured to acquire data relating to machining of a workpiece during machining of the workpiece by a wire electric discharge machine; a preprocessing part configured to create, based on the data acquired by the data acquisition part, machining condition data, machining member data and machining state data, as state data indicating a state of the machining; and a machine learning device configured to execute, based on the state data created by the preprocessing part, processing relating to machine learning using a learning model indicating correlation between a machining state in the wire electric discharge machine and presence/absence of a possibility of disconnection occurrence of a wire electrode in the wire electric discharge machine and a disconnection cause by a plurality of class sets.

5 Claims, 10 Drawing Sheets

(51) Int. Cl.
    *G05B 19/18*     (2006.01)
    *H04L 67/00*     (2022.01)
    *B23Q 17/09*     (2006.01)

(52) U.S. Cl.
    CPC ............ *H04L 67/00* (2013.01); *B23Q 17/098* (2013.01); *G05B 2219/49015* (2013.01)

(56) References Cited

U.S. PATENT DOCUMENTS

| | | | |
|---|---|---|---|
| 2017/0032281 A1* | 2/2017 | Hsu | H04L 67/10 |
| 2017/0060105 A1* | 3/2017 | Onodera | B23H 7/20 |
| 2017/0151618 A1* | 6/2017 | Shirai | G06N 20/00 |
| 2017/0320182 A1* | 11/2017 | Jeong | B23Q 17/098 |
| 2018/0281091 A1 | 10/2018 | Nakashima | |
| 2019/0061031 A1* | 2/2019 | D'Amario | G06N 20/00 |
| 2020/0097621 A1 | 3/2020 | Hu et al. | |
| 2020/0150632 A1 | 5/2020 | Takemoto et al. | |

FOREIGN PATENT DOCUMENTS

| | | |
|---|---|---|
| JP | 2001105238 A | 4/2001 |
| JP | 201042499 A | 2/2010 |
| JP | 2010240761 A | 10/2010 |
| JP | 201742882 A | 3/2017 |
| JP | 2018169934 A | 11/2018 |
| JP | 202075321 A | 5/2020 |
| TW | 201842457 A | 12/2018 |
| WO | 2011089648 A1 | 7/2011 |

OTHER PUBLICATIONS

Sameh Habib S., "Artificial Neural Network System as an Alternative for the Prediction of Process Parameters in Electrical Discharge Machining", Nov. 30, 2004, ResearchGate, retrieved on Apr. 29, 2020, URL:https://www.researchgate.net/profile/Sameh_Habib2/publication/271007853_ARTIFICIAL_NEURAL_NETWORK_SYSTEM_AS_AN_ALTERNATIVE_FOR_THE_PREDICTION_OF_PROCESS_PARAMETERS_IN_ELECTRICAL_DISCHARGE_MACHINING/. Conference: "IIW international Congress on Welding and Allied Processes", B17, Nov. 29-Dec. 1, 2004, Cairo, Egypt—Project: "Optimization of electrical discharge machining process"—Author: Sameh Habib at Shoubra-Benha University.

\* cited by examiner

FIG.8
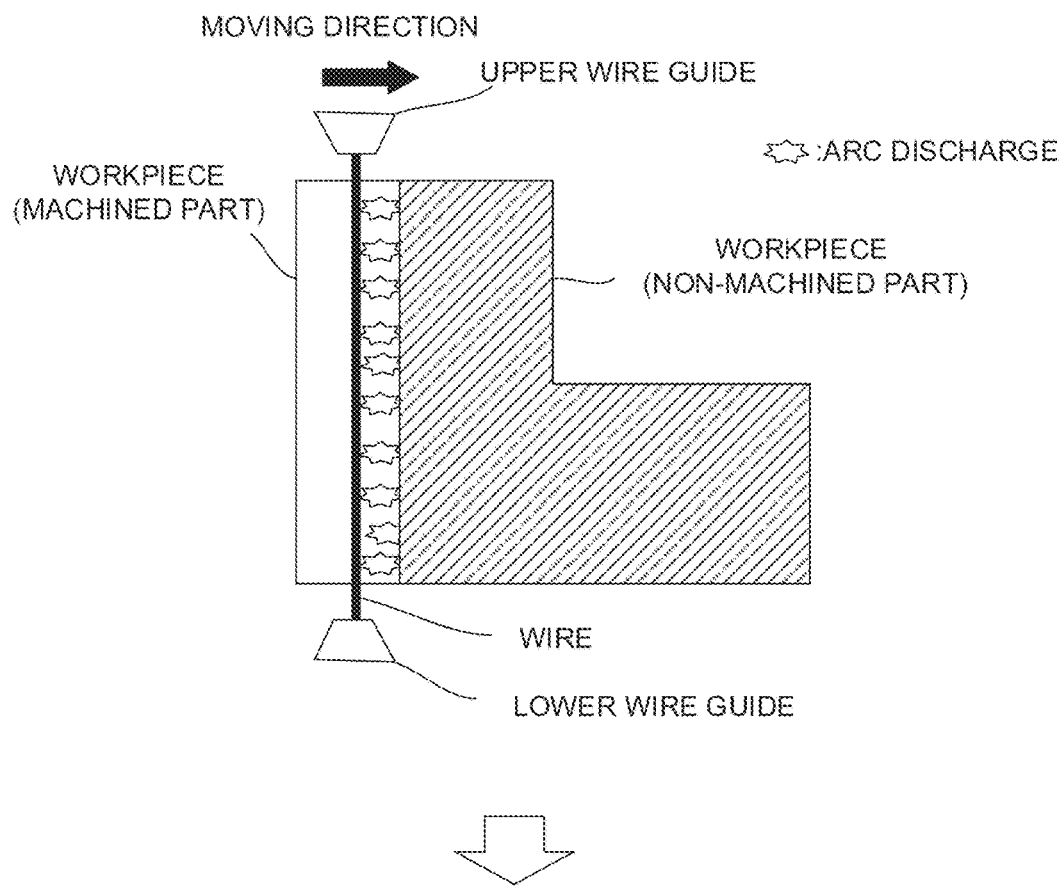
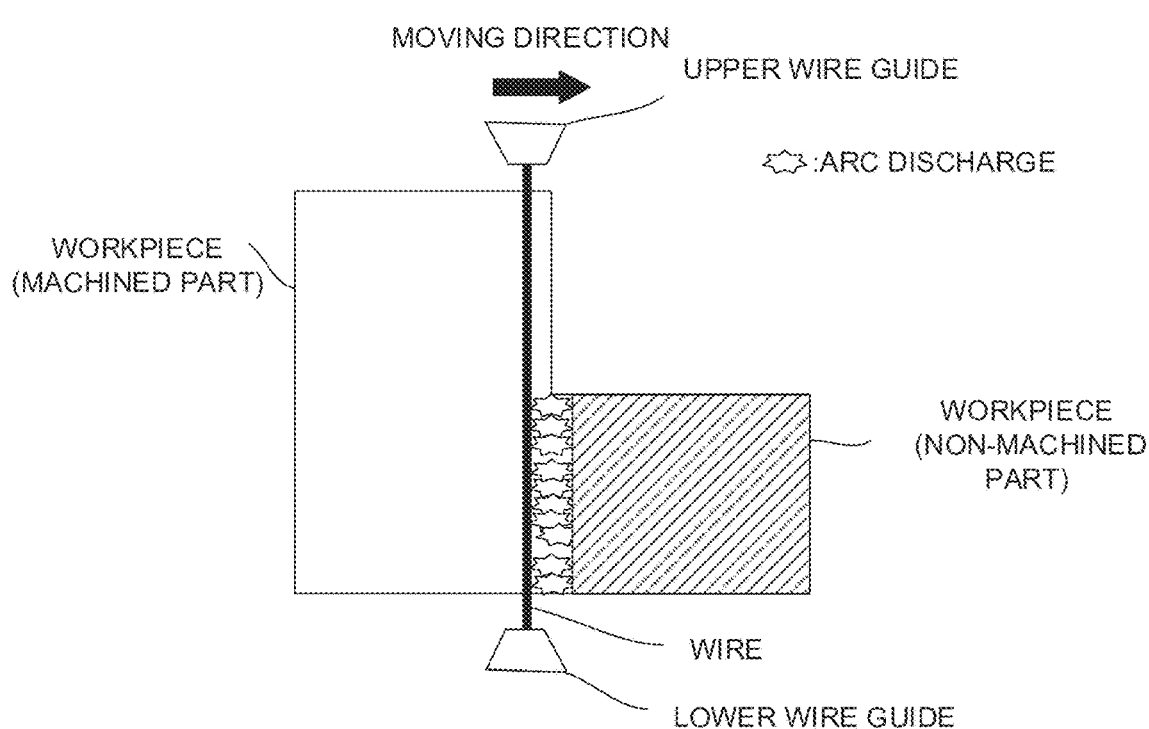

FIG.9
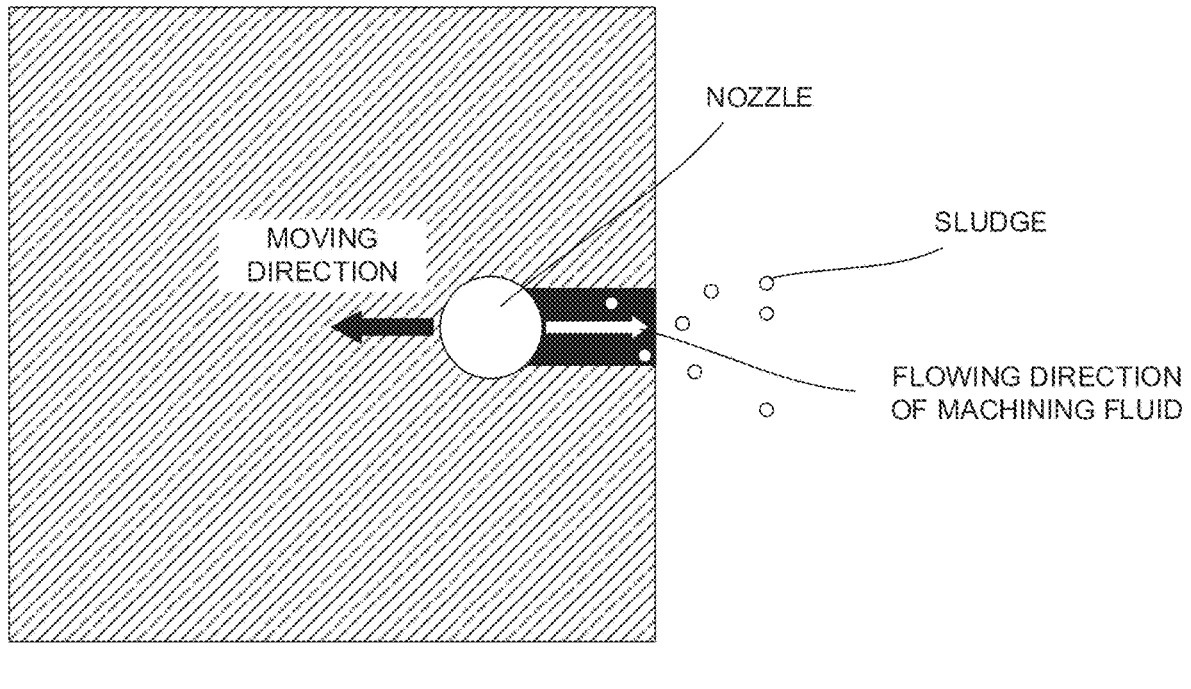
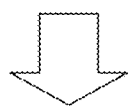
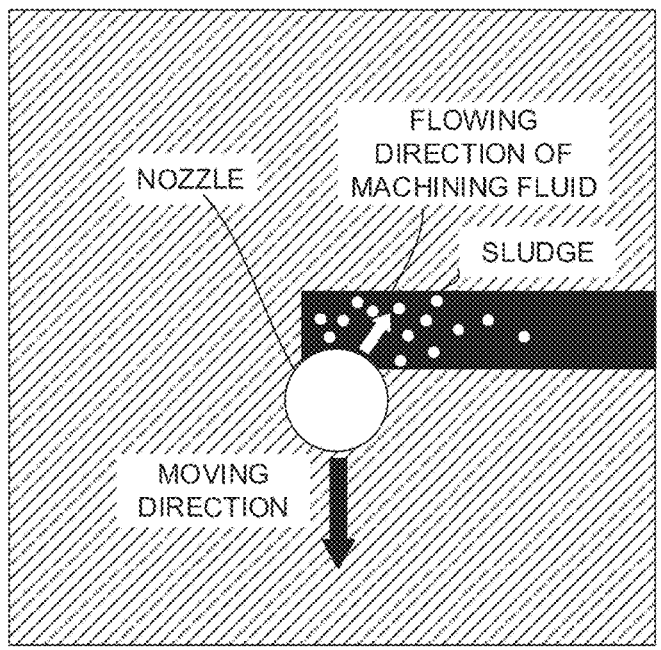

WIRE DISCONNECTION PREDICTION DEVICE

RELATED APPLICATIONS

The present application claims priority to Japanese Patent Application Number 2019-015766 filed Jan. 31, 2019, the disclosure of which is hereby incorporated by reference herein in its entirety.

BACKGROUND OF THE INVENTION

1. Field of the Invention

The present invention relates to a wire disconnection prediction device.

2. Description of the Related Art

In a wire electric discharge machine, a wire electrode used in machining may in some cases be disconnected while a workpiece to be machined is machined. Occurrence of disconnection of the wire depends on a situation of electric discharge machining.

As illustrated in FIG. 8, in the case where the workpiece to be machined has a step portion, the workpiece is machined under a machining condition for a thick plate to machine a thick part of the workpiece (the machining condition that an energy supply amount is large) (an upper diagram in FIG. 8). When machining of a thin part of the workpiece is started under the same machining condition (a lower diagram in FIG. 8), a wire is likely to be disconnected due to the excessively strong machining power.

As illustrated in FIG. 9, machining fluid is supplied between the wire and the workpiece from a nozzle arranged at a guide part of the wire during the electric discharge machining. The machining fluid supplied from the nozzle flows backward with respect to a wire moving direction and sludge (machining waste) is efficiently discharged when a straight line part is machined, however, when a corner part is machined, since the back in the wire moving direction is a dead end, the sludge (machining waste) is not efficiently discharged, normal electric discharge becomes insufficient, and the disconnection tends to occur.

When the wire is to be brought into the workpiece as illustrated in FIG. 10, the machining fluid supplied from the nozzle tends to spread around from a machining part, and there occurs a phenomenon that the sufficient machining fluid is not supplied to the machining part. Thus, when cutting into the workpiece, the wire tends to be disconnected.

In the case where impurities are mixed in the workpiece or the like, the frequency of occurrence of arc discharge varies between a workpiece material part and an impurity part. Therefore, biased electric discharge tends to be generated, and the wire disconnection tends to occur.

Such wire disconnection may cause streaks generated on a machining surface and worsen machining quality. When the wire is disconnected, we need to suspend machining, return a position of upper and lower guides to a machining start point of the workpiece, connect the wire, move the upper and lower guides to a disconnected position, and restart the machining, which decreases machining efficiency.

As a conventional technology for preventing the wire disconnection, Japanese Patent Laid-Open No. 2010-240761 discloses changing a machining condition at a step part where a plate thickness of the workpiece changes. Japanese Patent Laid-Open No. 2001-105238 discloses avoiding the disconnection by turning on a switch for current bypassing when abnormality is detected in a voltage applied between a wire electrode and the workpiece. International Publication No. WO2011/089648 discloses acquiring a disconnection threshold and an appropriate machining condition for each plate thickness in a trial machining process so as to set the appropriate machining condition according to the plate thickness during the machining.

However, the wire disconnection in the wire electric discharge machine occurs in various situations. Even when a method of changing the machining condition indicated in Japanese Patent Laid-Open No. 2010-240761 is to be adopted, experiments need to be carried out beforehand for the various situations where the disconnection tends to occur. It is difficult to cope with the disconnection occurring in combinations of the plurality of situations. Further, in the technology indicated in Japanese Patent Laid-Open No. 2001-105238, the threshold for determining an abnormal voltage varies depending on the situation of the machining. Therefore, evenly applied bypassing without considering the situation at the time when a predetermined voltage is detected does not always achieve efficient machining. In the technology indicated in International Publication No. WO2011/089648, the trial machining process needs to be performed for the plurality of plate thicknesses beforehand for each of various kinds of workpieces. Thus, there is a problem that it takes time and labor to cope with all kinds of situations.

SUMMARY OF THE INVENTION

An object of the present invention is to provide a wire disconnection prediction device capable of predicting wire disconnection according to various machining situations in machining by a wire electric discharge machine.

In a wire disconnection prediction device according to an aspect of the present invention, the above-described problems are solved by predicting a wire disconnection risk using machining data relating to the machining situation acquired during the machining by the wire electric discharge machine and a machine learning model. As the learning model used by the wire disconnection prediction device according to an aspect of the present invention, it is assumed to use the learning model capable of calculating a correlation value of a machining condition and the wire disconnection risk, and as an example, the present description shows the example utilizing k-nearest neighbor algorithm which is one method of state determination using machine learning. The wire disconnection prediction device according to an aspect of the present invention acquires data (normal data) when a wire is not disconnected and data (abnormal data) acquired in various wire disconnection patterns (the disconnection caused because machining fluid is too weak, the disconnection caused because electric discharge suspension time is too short, the disconnection caused because a peak value of electric discharge pulses is too high, or the like), and generates the learning model for which the pieces of data are classified as a set (class) of data for each pattern. Then, the wire disconnection prediction device according to an aspect of the present invention calculates a similarity degree between data (unknown data) relating to the machining acquired during the machining of a workpiece by the wire electric discharge machine and known data within the individual class of the learning model, and estimates the wire disconnection risk and the wire disconnection pattern from the calculation result. Then, the wire disconnection prediction device optimizes the machining condition by the wire electric discharge machine based on the estimated wire disconnection risk and wire disconnection pattern.

Then, another aspect of the present invention is the wire disconnection prediction device for estimating a wire disconnection risk during machining of a workpiece in a wire electric discharge machine, and the wire disconnection prediction device includes: a data acquisition part configured to acquire data relating to machining of the workpiece during machining of the workpiece by the wire electric discharge machine; a preprocessing part configured to create, based on the data acquired by the data acquisition part, machining condition data of a condition relating to the machining commanded in the machining of the workpiece, machining member data relating to a member used in the machining, and machining state data during the machining of the workpiece, as state data indicating a state of the machining; and a machine learning device configured to execute, based on the state data created by the preprocessing part, processing relating to machine learning using a learning model indicating correlation between a machining state in the wire electric discharge machine and presence/absence of a possibility of disconnection occurrence of a wire electrode in the wire electric discharge machine and a disconnection cause by a plurality of class sets.

According to the present invention, the wire disconnection can be predicted corresponding to various machining situations in the machining by the wire electric discharge machine, and the machining condition of the wire electric discharge machine can be automatically adjusted based on the predicted wire disconnection risk.

BRIEF DESCRIPTION OF THE DRAWINGS

Objects and features described above and the like of the present invention will be clarified from description of embodiments below with reference to attached drawings. Among the drawings:

FIG. 8 is a diagram illustrating an example of the wire disconnection risk in a wire electric discharge machine;

FIG. 9 is a diagram illustrating another example of the wire disconnection risk in the wire electric discharge machine.

DETAILED DESCRIPTION OF THE PREFERRED EMBODIMENTS

Hereinafter, the embodiments of the present invention will be described together with the drawings.

Figure 1:
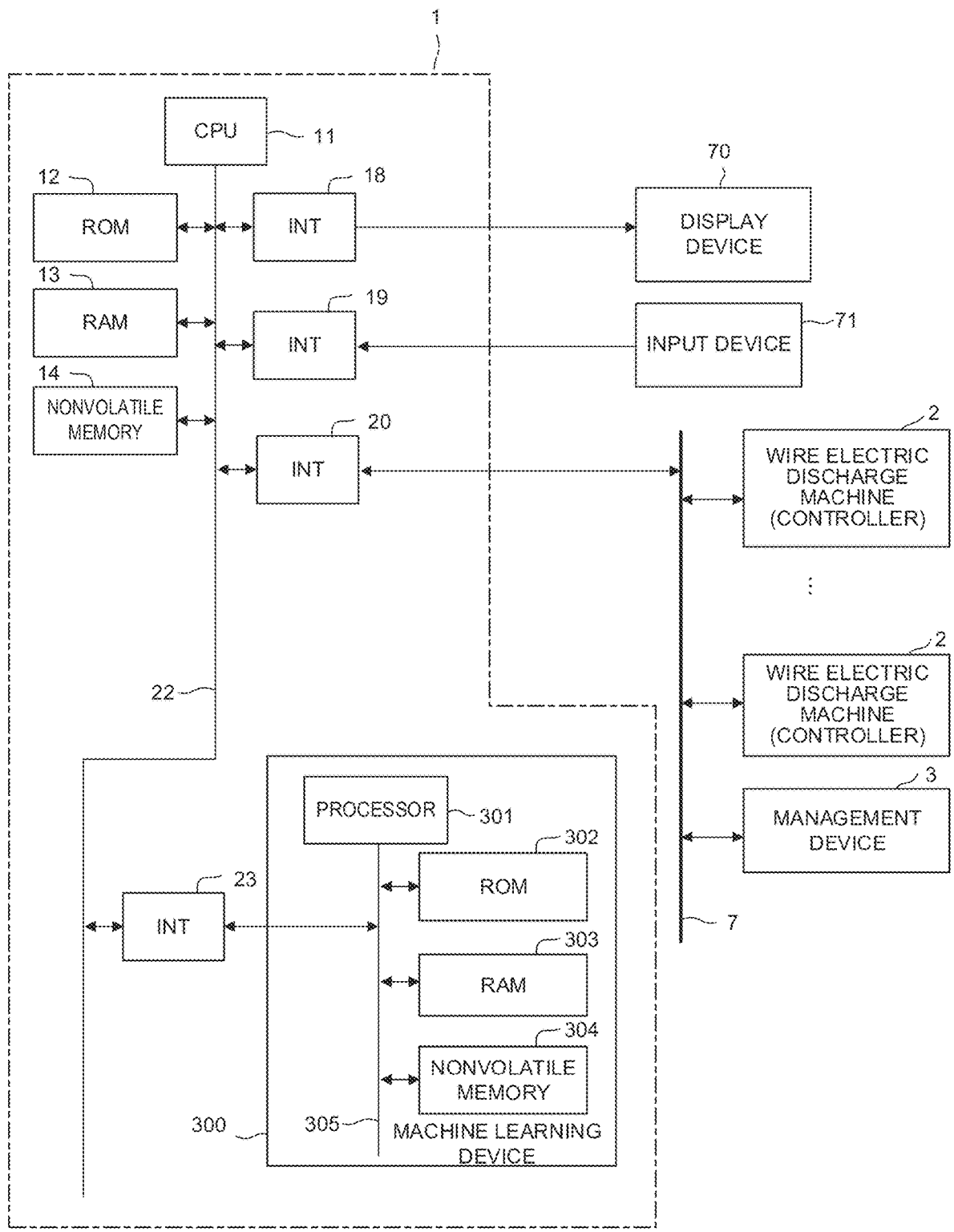
FIG. 1 is a schematic hardware configuration diagram of a wire disconnection prediction device according to an embodiment of the present invention.

FIG. 1 is a schematic hardware configuration diagram illustrating a main part of a wire disconnection prediction device according to one embodiment of the present invention. A wire disconnection prediction device 1 of the present embodiment can be mounted as a controller that controls a wire electric discharge machine. The wire disconnection prediction device 1 can be mounted as a personal computer provided together with the controller that controls the wire electric discharge machine, a management device 3 connected with the controller that controls the wire electric discharge machine through a network, or a computer such as an edge computer, a cell computer, a host computer or a cloud server. The present embodiment illustrates an example of a case of mounting the wire disconnection prediction device 1 as a computer connected with the controller that controls the wire electric discharge machine through a cable/wireless network 7.

A CPU 11 provided in the wire disconnection prediction device 1 according to the present embodiment is a processor that generally controls the wire disconnection prediction device 1. The CPU 11 reads a system program stored in a ROM 12 connected through a bus 22, and controls the entire wire disconnection prediction device 1 according to the system program. A RAM 13 stores calculation data temporarily, display data for a display device 70, various kinds of data inputted by an operator through an input device 71 and the like.

A nonvolatile memory 14 is configured by a memory and an SSD (Solid State Drive) or the like backed up by a battery not shown in the figure for example, and is configured as the memory in which a storage state is held even when a power source of the wire disconnection prediction device 1 is turned off. The nonvolatile memory 14 stores a setting area where setting information relating to an operation of the wire disconnection prediction device 1 is stored, the data inputted from the input device 71, various kinds of data (a workpiece material, a workpiece shape, a wire material, a wire diameter or the like) acquired from each wire electric discharge machine 2, various kinds of physical quantities (a machining route, a machining voltage, a current, a speed, a machining fluid amount, a machining fluid pressure, the number of times of normal electric discharge, the number of times of abnormal electric discharge or the like) detected in the operation of each wire electric discharge machine 2, data read through a non-illustrated external storage device or a network, and the like. Programs and the various kinds of data stored in the nonvolatile memory 14 may be developed in the RAM 13 when executed/when utilized. In the ROM 12, the system program including a known analysis program or the like for analyzing the various kinds of data is written beforehand.

The wire disconnection prediction device 1 is connected with the cable/wireless network 7 through an interface 20. To the network 7, at least one wire electric discharge machine 2 and the management device 3 that manages machining work by the wire electric discharge machine 2 or the like are connected, and the wire electric discharge machine 2 and the management device 3 mutually exchange the data with the wire disconnection prediction device 1.

To the display device 70, the individual pieces of data read on the memory, and data obtained as a result of executing the program or the like are outputted through an interface 18 and displayed. In addition, the input device 71 configured by a keyboard, a pointing device or the like delivers commands and data or the like based on operations by an operator to the CPU 11 through an interface 19.

An interface 23 connects a machine learning device 300 to the wire disconnection prediction device 1. The machine learning device 300 includes a processor 301 that controls the entire machine learning device 300, a ROM 302 that stores the system program or the like, a RAM 303 for performing temporary storage in individual processing relating to machine learning, and a nonvolatile memory 304 used for storing a learning model or the like. The machine learning device 300 observes individual information (for example, the workpiece material, the workpiece shape, the wire material, the wire diameter, the machining route, the machining voltage, the current, the speed, the machining fluid amount, the machining fluid pressure, the number of times of the normal electric discharge, the number of times of the abnormal electric discharge or the like) acquirable in the wire disconnection prediction device 1 through the interface 23. The wire disconnection prediction device 1 acquires a processing result outputted from the machine learning device 300 through the interface 23, and stores the acquired result, displays the result or transmits the result through a non-illustrated network or the like to other devices.

Figure 2:
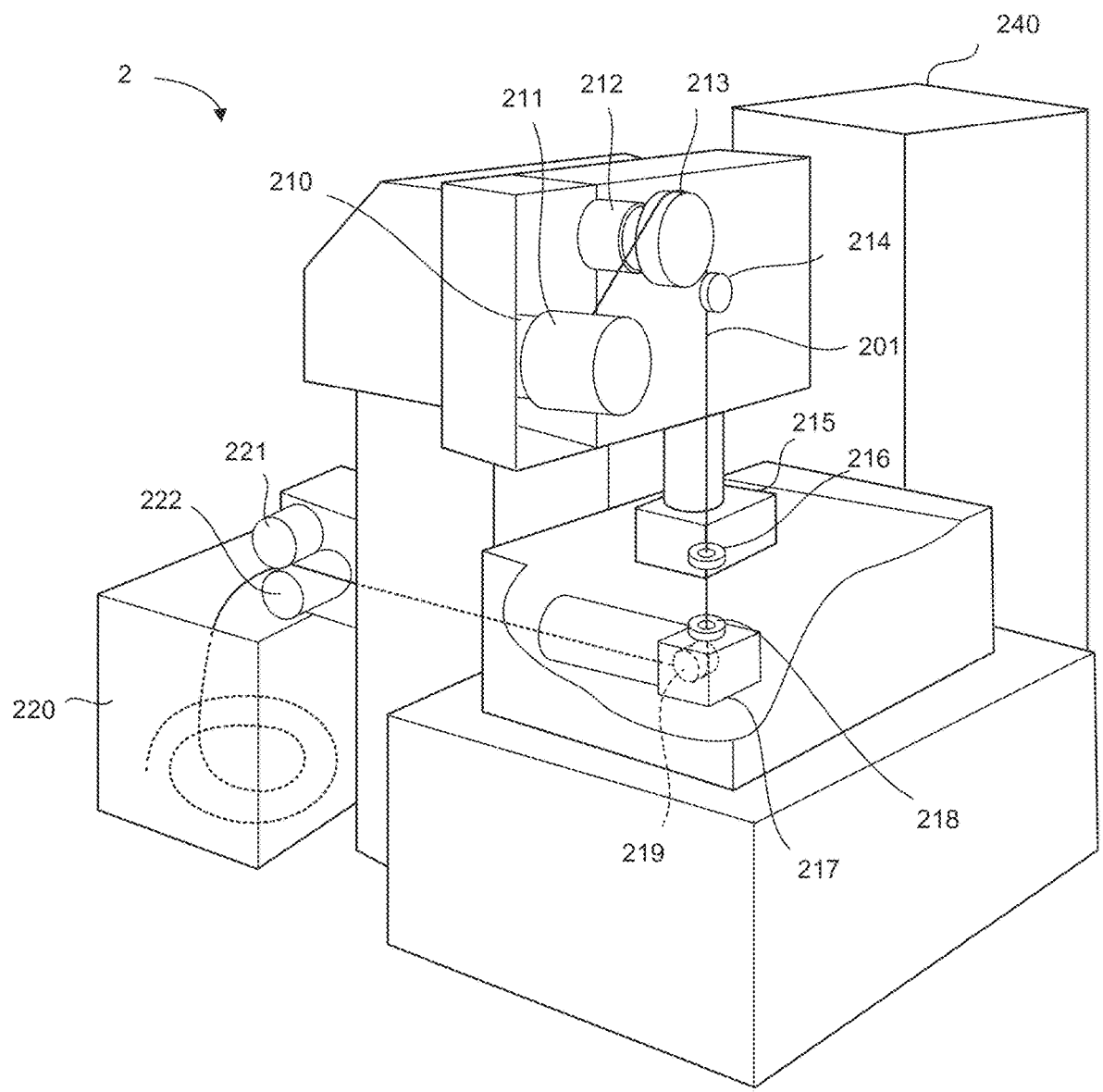
FIG. 2 is a schematic configuration diagram of a wire electric discharge machine according to an embodiment.

FIG. 2 is a schematic configuration diagram of the wire electric discharge machine 2. A wire bobbin 211 around which a wire electrode 201 is wound is imparted with predetermined low torque commanded in a direction opposite to a pull-out direction of the wire electrode 201 by a send-out part torque motor 210. The wire electrode 201 delivered from the wire bobbin 211 passes through a plurality of guide rollers (not illustrated). By a brake shoe 213 driven by a brake motor 212, tension between the brake shoe 213 and a feed roller 222 driven by a wire electrode feed motor (not illustrated) is adjusted.

A tension detector 214 is a detector that detects magnitude of the tension of the wire electrode 201 traveling between an upper guide 215 and a lower guide 217. The wire electrode 201 which passes through the brake shoe 213 goes through an upper wire support guide 216 provided on the upper guide 215, a lower wire support guide 218 provided on the lower guide 217, and a lower guide roller 219. Thereafter, the wire electrode 201 is held between a pinch roller 221 and the feed roller 222 driven by the wire electrode feed motor (not illustrated), and is recovered into a wire electrode recovery box 220.

In an electric discharge machining area between the upper guide 215 and the lower guide 217, a workpiece (not illustrated) to be an electric discharge machining target is mounted on a table (not illustrated). For the workpiece, a high frequency voltage is applied from a power source for machining to the wire electrode 201 and electric discharge machining is performed. In addition, a main body of the wire electric discharge machine 2 is controlled by a controller 240.

The wire electric discharge machine 2 machines the workpiece (not illustrated) by applying a voltage to the wire electrode 201 and the workpiece in machining fluid, generating arc discharge, melting the workpiece by heat of the discharge, and blowing off the melted workpiece by a vaporization explosion of the rapidly heated machining fluid. In the wire electric discharge machine 2, states of the individual parts are detected by a sensor or the like, and a controller 240 transmits detected values through a network 7 to the wire disconnection prediction device 1.

Figure 3:
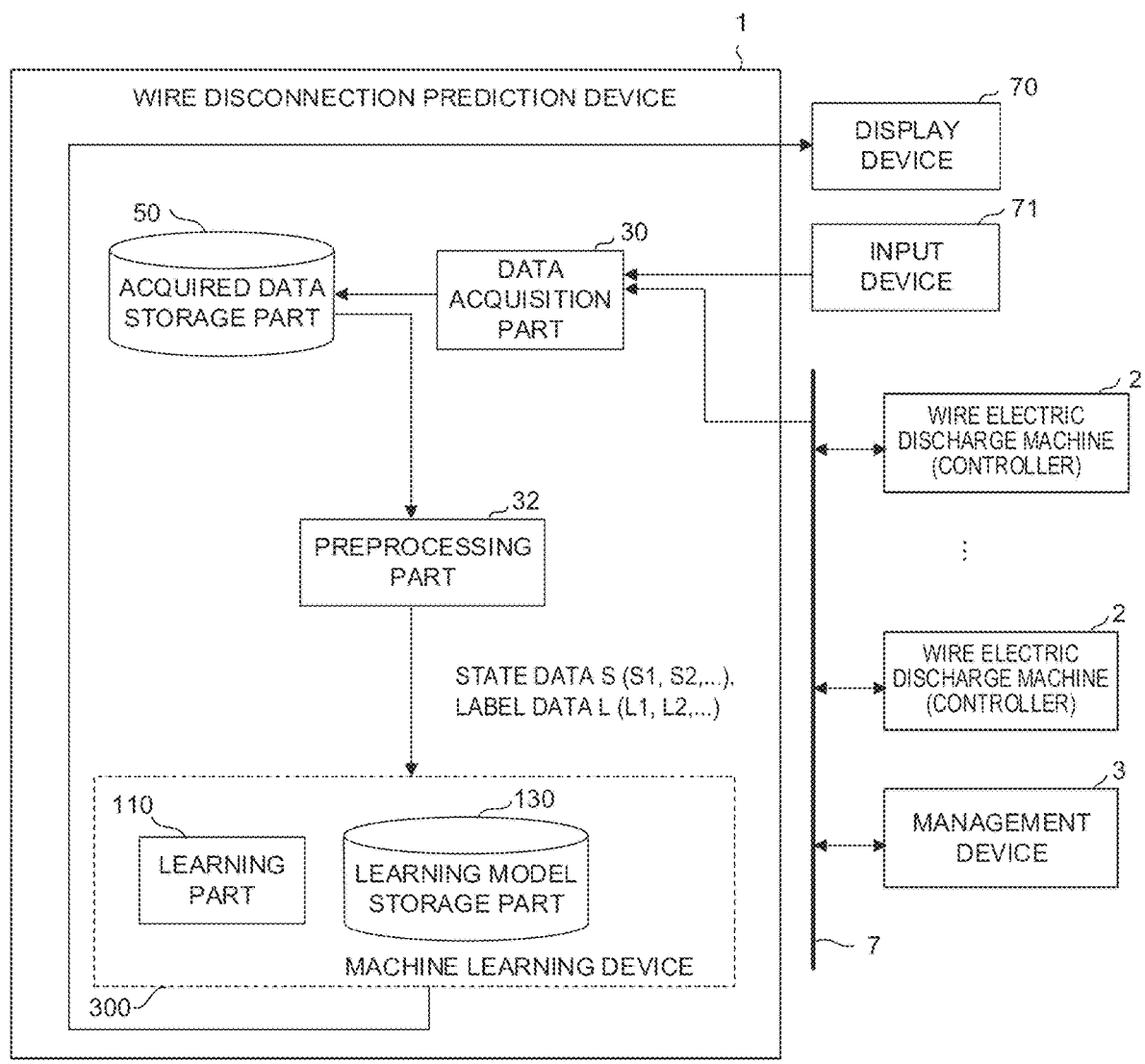
FIG. 3 is a schematic functional block diagram of the wire disconnection prediction device according to an embodiment.

FIG. 3 is a schematic functional block diagram of the wire disconnection prediction device 1 and the machine learning device 300 according to one embodiment. The wire disconnection prediction device 1 illustrated in FIG. 3 includes a configuration required in the case where the machine learning device 300 performs learning (learning mode). Individual functional blocks (a data acquisition part 30, a preprocessing part 32, a learning part 110 or the like) illustrated in FIG. 3 are achieved by the CPU 11 provided in the wire disconnection prediction device 1 and the processor 301 of the machine learning device 300 illustrated in FIG. 1 executing the respective system programs and controlling the operations of the individual parts of the wire disconnection prediction device 1 and the machine learning device 300.

The wire disconnection prediction device 1 of the present embodiment includes the data acquisition part 30, and the preprocessing part 32. The machine learning device 300 provided in the wire disconnection prediction device 1 includes the learning part 110. The nonvolatile memory 14 (FIG. 1) includes an acquired data storage part 50 that stores the data acquired from the wire electric discharge machine 2 by the data acquisition part 30. The nonvolatile memory 304 (FIG. 1) of the machine learning device 300 includes a learning model storage part 130 that stores a learning model constructed by machine learning by the learning part 110.

The data acquisition part 30 acquires various kinds of data from the wire electric discharge machine 2. The data acquisition part 30 acquires the individual pieces of data such as the workpiece material, the workpiece shape, the wire material, the wire diameter, the machining route, the machining voltage, the machining current, the machining speed, the machining fluid amount, the machining fluid pressure, the number of times of the normal electric discharge, the number of times of the abnormal electric discharge during the machining of the wire electric discharge machine 2 for example, and stores the data in the acquired data storage part 50. The data acquisition part 30 acquires a plurality of pieces of data relating to the wire electric discharge machine 2 when the machining is normally performed in the wire electric discharge machine 2 (that is, when the wire electrode 201 is not disconnected) and when the wire electrode 201 is disconnected in the wire electric discharge machine 2 (right before the wire electrode 201 is disconnected). In addition, for the data acquired when the wire electrode 201 is disconnected (right before the wire electrode 201 is disconnected) in the wire electric discharge machine 2, the data acquisition part 30 also acquires adjustment details of the machining condition performed before the wire electrode 201 is disconnected, or adjustment details of the machining condition performed when the machining is restarted after the disconnection. The data acquisition part 30 can acquire the data as a condition relating to the machining set to the controller of the wire electric discharge machine 2, command values commanded to the individual parts by the controller of the wire electric discharge machine 2, measurement values measured from the individual parts by the controller of the wire electric discharge machine 2, and a detection value by a separately installed sensor or the like. The data acquisition part 30 may acquire the data from the other devices through the non-illustrated external storage device or the cable/wireless network.

The preprocessing part 32 creates learning data used in learning by the machine learning device 300 based on the data acquired by the data acquisition part 30. The preprocessing part 32 creates the learning data for which the individual pieces of data are converted (digitized, sampled or the like) to a unified form handled in the machine learning device 300. The preprocessing part 32 creates state data S of a predetermined form for so-called unsupervised learning performed by the machine learning device 300 as the learning data. The state data S created by the preprocessing part 32 includes machining condition data S1 including the command values of a machining voltage, a machining current, a machining speed, the machining fluid amount and the machining fluid pressure relating to the machining of the workpiece of the wire electric discharge machine 2, machining member data S2 including the material of the wire used in the machining in the wire electric discharge machine 2, the wire diameter, the material of the workpiece to be machined or the like, and machining state data S3 including the voltage, the current, the number of times of the normal electric discharge, the number of times of the abnormal electric discharge or the like measured in the machining of the workpiece of the wire electric discharge machine 2. In addition, the label data L created by the preprocessing part 32 includes disconnection pattern data L1 indicating presence/absence of disconnection occurrence and the machining condition adjusted before the disconnection.

For the machining condition data S1, the command values commanded to the individual parts by the controller of the wire electric discharge machine 2, which are acquired by the data acquisition part 30, or the like can be used. For the machining condition data S1, commands by a machining program and the various kinds of command values installed in the wire electric discharge machine 2 may be used.

For the machining member data S2, information of the wire and the workpiece set in the controller of the wire electric discharge machine 2, which are acquired by the data acquisition part 30, can be used.

For the machining state data S3, the measurement values measured from the individual parts by the controller of the wire electric discharge machine 2 and the detection value by the separately installed sensor or the like, which are acquired by the data acquisition part 30, can be used. For the machining state data S3, for example, parameters (known parameters in wire electric discharge machining such as electric discharge pulse time, suspension pulse time, a peak value and a pulse width) indicating time-sequential data of a voltage value and a voltage waveform measured during the machining, parameters (known parameters in the wire electric discharge machining such as the electric discharge pulse time, the suspension pulse time, the peak value and the pulse width) indicating time-sequential data of a current value and a current waveform, and the numbers of times of the normal electric discharge (for example, an interpolar voltage value exceeds a determination level and then becomes lower than the determination level after a lapse of determination time) and the abnormal electric discharge (for example, the interpolar voltage value exceeds the determination level and then becomes lower than the determination level before the lapse of the determination time, or does not exceed the determination level or the like) within a predetermined time period may be used.

The disconnection pattern data L1 is one piece of the label data for the state data S created by the preprocessing part 32. The disconnection pattern data L1 includes a label indicating the presence/absence of the disconnection occurrence of the wire electrode 201 in the state where the state data S is acquired and a disconnection cause estimated when the wire electrode 201 is disconnected. When the data is acquired in the state where the wire electrode 201 is not disconnected, the preprocessing part 32 takes a label value indicating that there is no disconnection, for the disconnection pattern data L1 of the state data S. When the data is acquired in the state where the wire electrode 201 is disconnected (the state right before the disconnection of the wire electrode 201), the preprocessing part 32 takes a label value indicating the disconnection occurrence and the machining condition adjusted before the disconnection, for the disconnection pattern data L1 of the state data S. For example, when the data is acquired when the machining is normally performed without the disconnection of the wire electrode 201, the label value of "no disconnection" may be taken for the disconnection pattern data L1. In addition, when the data is acquired when the wire electrode 201 is disconnected in the machining after reducing electric discharge suspension time which is one of the machining conditions, the disconnection pattern data L1 may take the label value of "disconnection under the condition of short electric discharge suspension time". When the data is acquired when the wire electrode 201 is disconnected in the machining after reducing a machining fluid amount which is one of the machining condition, the disconnection pattern data L1 may take the label value of "disconnection under the condition of a small machining fluid amount". In this manner, according to the data acquired when the wire electrode 201 is disconnected, the disconnection pattern data L1 can take various label values.

The learning part 110 performs the supervised learning using the learning data created by the preprocessing part 32, and generates (learns) the learning model obtained by learning correlation between the presence/absence of a possibility of the disconnection occurrence of the wire electrode 201 in the wire electric discharge machine 2 and the disconnection cause and the state data S at the time. In the present embodiment, the correlation between the presence/absence of the possibility of the disconnection occurrence of the wire electrode 201 in the wire electric discharge machine 2 and the machining condition adjusted before the disconnection, and the state data S at the time is obtained. Then, the learning part 110 generates the learning model obtained by gathering the state data S for which the disconnection pattern data L1 takes the same label value as respectively different class sets, and stores the generated learning model in the learning model storage part 130.

Figure 4:
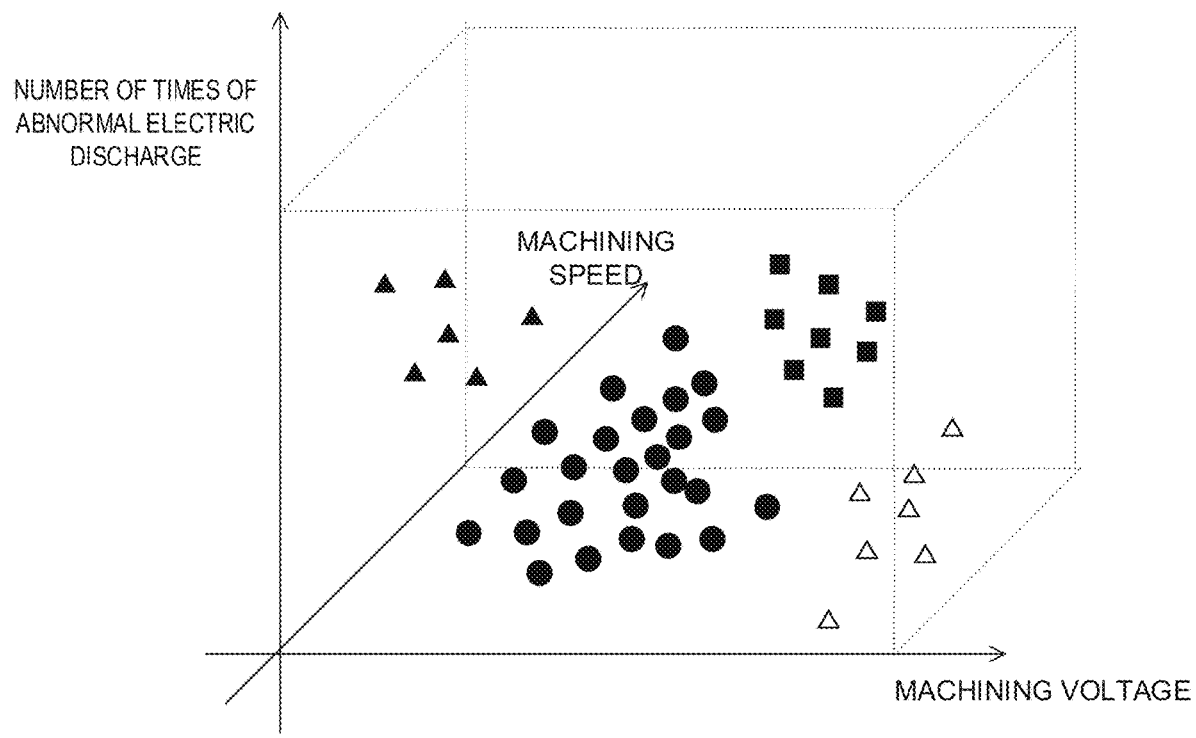
FIG. 4 is a diagram illustrating an image of a learning model generated by a learning part.

FIG. 4 is a diagram illustrating an image of the learning model created by the learning part 110. In FIG. 4, to recognize the image of the learning model easily, the image is illustrated assuming that the learning data is configured by the three parameters of the machining voltage, the machining speed and the number of times of the abnormal electric discharge. In an example in FIG. 4, the state data S acquired at normal time (no disconnection), the state data S acquired when the disconnection occurs under the condition of the short electric discharge suspension time, the state data S acquired when the disconnection occurs under the condition of the small machining fluid amount, and the state data S acquired when the disconnection occurs under the condition of high machining power are respectively plotted on space. Then, each state data S is classified as the class set for each label value of the disconnection pattern data L1. In addition, a distance (Euclidean distance) between two arbitrary points in the plot indicates a similarity degree of both. Such a learning model is generated, and when the data (state data S) during the machining is newly acquired from the wire electric discharge machine 2, based on the distance (Euclidean distance) between the acquired state data S and the data belonging to the individual class sets configuring the learning model, to which one of the individual class sets configuring the learning model the acquired state data S belongs is estimated. Thus, it becomes possible to estimate the presence/absence of the possibility of the disconnection occurrence of the wire electrode 201 in a current machining state and the cause when there is the possibility of the disconnection.

● shows "STATE DATA ACQUIRED AT NORMAL TIME".

▲ shows "STATE DATA ACQUIRED WHEN DISCONNECTION OCCURS UNDER CONDITION OF SHORT ELECTRIC DISCHARGE SUSPENSION TIME".

■ shows "STATE DATA ACQUIRED WHEN DISCONNECTION OCCURS UNDER CONDITION OF SMALL MACHINING FLUID AMOUNT".

Δ shows "STATE DATA ACQUIRED WHEN DISCONNECTION OCCURS UNDER CONDITION OF HIGH MACHINING POWER".

Figure 5:
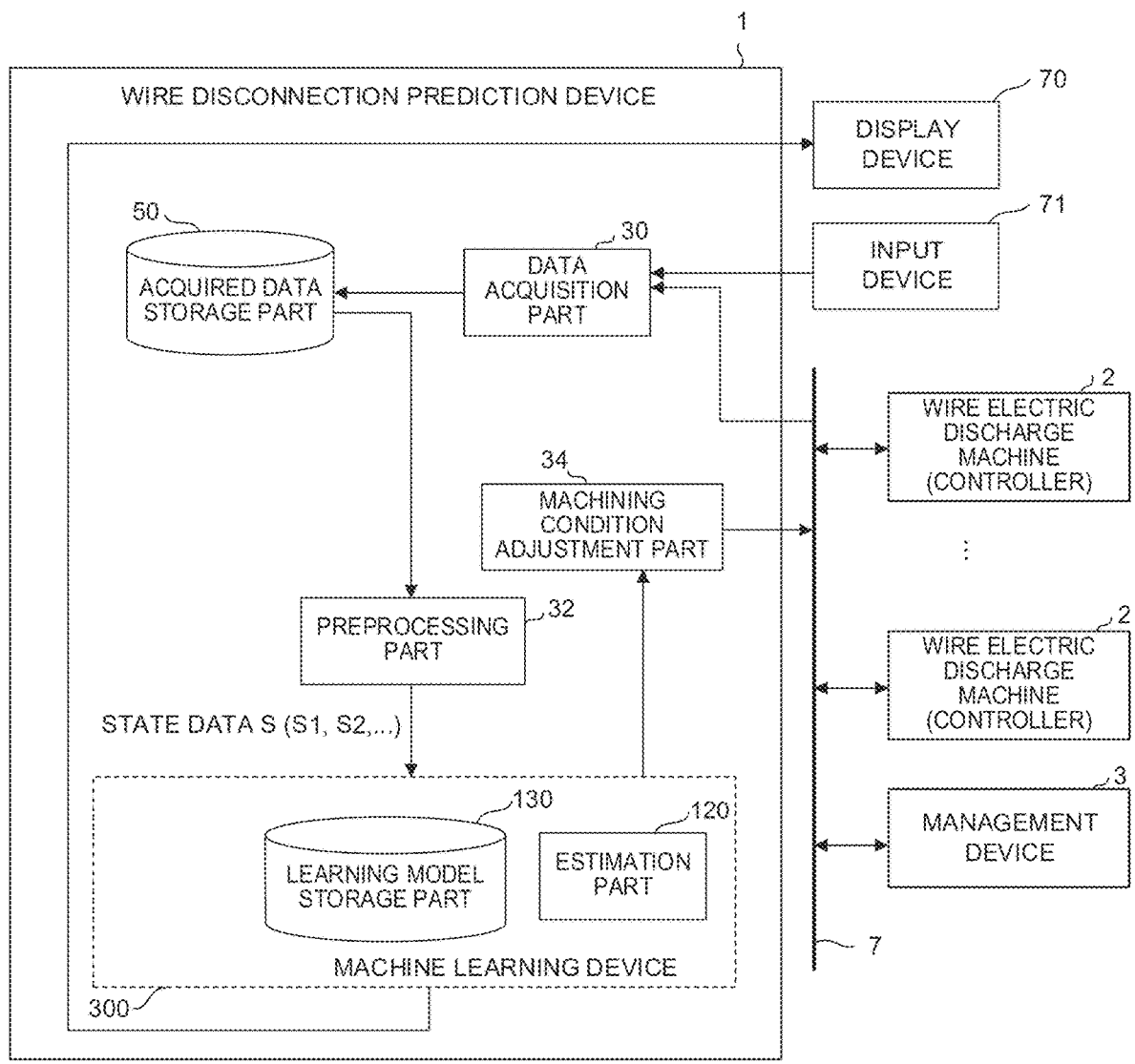
FIG. 5 is a schematic functional block diagram of the wire disconnection prediction device according to another embodiment.

FIG. 5 is a schematic functional block diagram of the wire disconnection prediction device 1 and the machine learning device 300 according to another embodiment. The wire disconnection prediction device 1 of the present embodiment includes a configuration required in the case where the machine learning device 300 performs estimation (estimation mode). The individual functional blocks illustrated in FIG. 5 are achieved by the CPU 11 provided in the wire disconnection prediction device 1 and the processor 301 of the machine learning device 300 illustrated in FIG. 1 executing the respective system programs and controlling the operations of the individual parts of the wire disconnection prediction device 1 and the machine learning device 300.

The wire disconnection prediction device 1 of the present embodiment includes the data acquisition part 30 and the preprocessing part 32 similarly to the previous embodiment, and further includes a machining condition change part 34. The machine learning device 300 provided in the wire disconnection prediction device 1 includes an estimation part 120. Further, the nonvolatile memory 14 (FIG. 1) includes the acquired data storage part 50 that stores the data acquired from the wire electric discharge machine 2 by the data acquisition part 30, and the nonvolatile memory 304 (FIG. 1) of the machine learning device 300 includes the learning model storage part 130 that stores the learning model constructed by the machine learning by the learning part 110 (FIG. 3).

The data acquisition part 30 according to the present embodiment includes a function similar to the function of the data acquisition part 30 of the previous embodiment. In addition, the preprocessing part 32 according to the present embodiment creates the state data S used to estimate the machining state of the wire electric discharge machine 2 by the machine learning device 300, based on the data acquired by the data acquisition part 30, by a method similar to the method described for the previous embodiment.

The estimation part 120 estimates, based on the state data S created by the preprocessing part 32, the presence/absence of the possibility of the disconnection occurrence of the wire electrode 201 in the current machining state and estimates the disconnection cause when there is the possibility of the disconnection, using the learning model stored in the learning model storage part 130. The estimation part 120 of the present embodiment estimates the presence/absence of the possibility of the disconnection occurrence of the wire electrode 201 in the current machining state and estimates the disconnection cause when there is the possibility of the disconnection, based on the relation between the individual data included in the learning model (the plurality of class sets indicating the correlation between the presence/absence of the possibility of the disconnection occurrence of the wire electrode 201 in the wire electric discharge machine 2 and the machining condition at the time of the disconnection and the state data S at the time) created by the learning part 110 (FIG. 2) and the state data S inputted from the preprocessing part 32.

The estimation part 120 according to the present embodiment estimates the wire disconnection risk of the wire electric discharge machine 2 by k-nearest neighbor algorithm for example. In this case, the estimation part 120 obtains a distance on a vector space of the data among the individual pieces of data included in the learning model, for the state data S of an estimation target (the machining condition data S1, the machining member data S2 and the machining state data S3) created by the preprocessing part 32, and specifies k pieces of data within the learning model near the state data S of an estimation target. Then, the estimation part 120 sums up the label values imparted in the specified k pieces of data, and estimates that the class set of the most common label value as the sum-up result is the class set to which the state data S of the estimation target belongs. Then, based on the label value imparted to the class set to which the state data S of the estimation target belongs, the estimation part 120 estimates the presence/absence of the possibility of the disconnection occurrence of the wire electrode 201 in the current machining state, and estimates the disconnection cause when there is the possibility of the disconnection. Note that, when there are the plurality of class sets of the most common label value, the estimation part 120 may set an order among the class sets beforehand, and estimate the class set to which the state data S of the estimation target belongs according to the order. In addition, a rule may be set beforehand to estimate the class set including the data nearest to the state data S among the class sets of the most common label value as the class set to which the state data S belongs.

Figure 6:
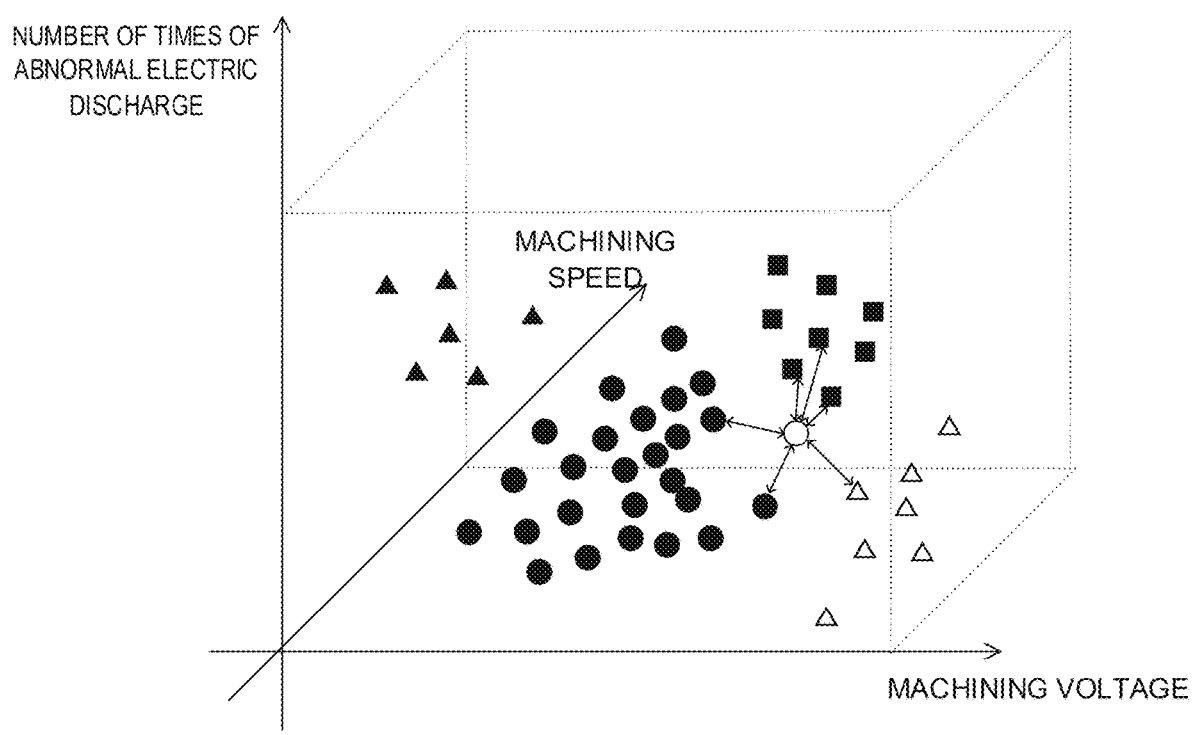
FIG. 6 is a diagram illustrating an image of estimation of presence/absence of a disconnection possibility of a wire electrode and a cause by an estimation part.

FIG. 6 is a diagram illustrating an image of estimation processing by the estimation part 120. FIG. 6 illustrates the case where the preprocessing part 32 creates state data Sa based on the data acquired by the data acquisition part 30. In FIG. 6, a distance between the state data Sa acquired in a predetermined machining state and the individual data included in the learning model is calculated, and k pieces (in the example of FIG. 6, k=6) of data near the state data Sa are specified. A breakdown is that two pieces of data are acquired when there is no disconnection, three pieces of data are acquired when the disconnection occurs under the condition of the small machining fluid amount, and one piece of data is acquired when the disconnection occurs under the condition of the high machining power. Therefore, the estimation part 120 estimates that the state data Sa belongs to the same class set as the data acquired when the disconnection occurs under the condition of the small machining fluid amount. Then, based on the estimation result, the estimation part 120 estimates that there is the possibility of the disconnection of the wire electrode 201 in the current machining state. In addition, it is estimated that the disconnection cause is the small machining fluid amount.

● shows "STATE DATA ACQUIRED AT NORMAL TIME".

▲ shows "STATE DATA ACQUIRED WHEN DISCONNECTION OCCURS UNDER CONDITION OF SHORT ELECTRIC DISCHARGE SUSPENSION TIME".

■ shows "STATE DATA ACQUIRED WHEN DISCONNECTION OCCURS UNDER CONDITION OF SMALL MACHINING FLUID AMOUNT".

Δ shows "STATE DATA ACQUIRED WHEN DISCONNECTION OCCURS UNDER CONDITION OF HIGH MACHINING POWER".

○ shows "STATE DATA Sa OF ESTIMATION TARGET".

Figure 7:
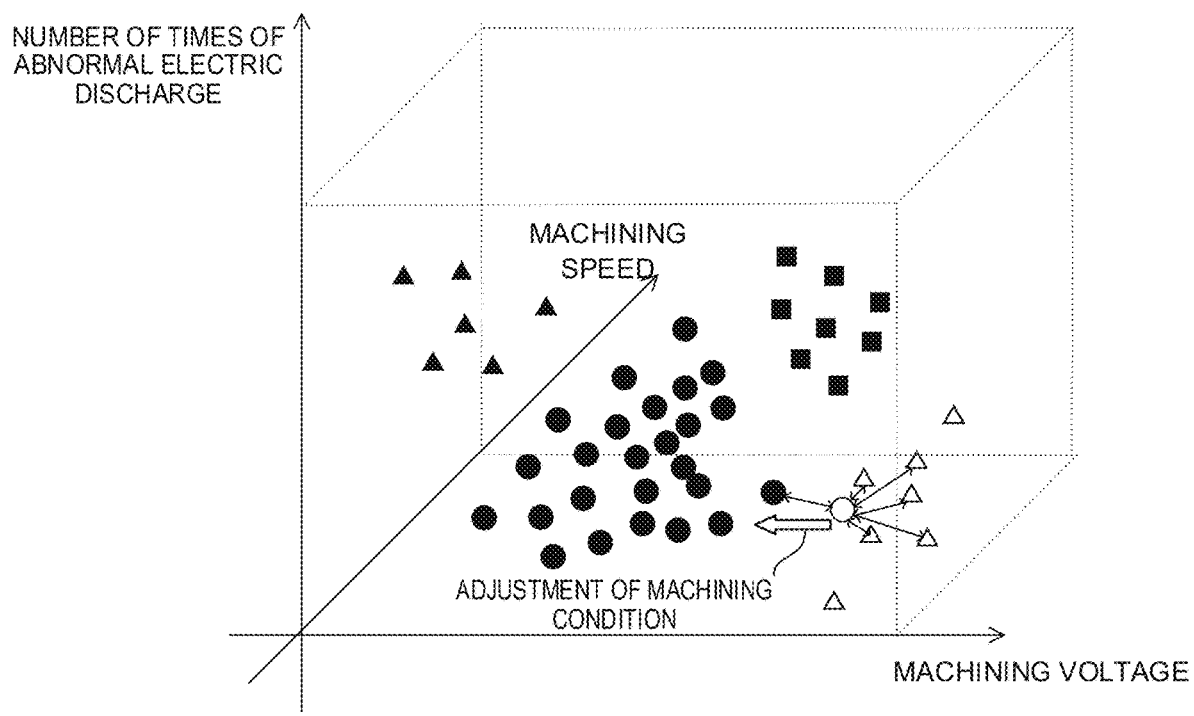
FIG. 7 is a diagram illustrating an image of estimation of a wire disconnection risk by an estimation part.
Figure 10:
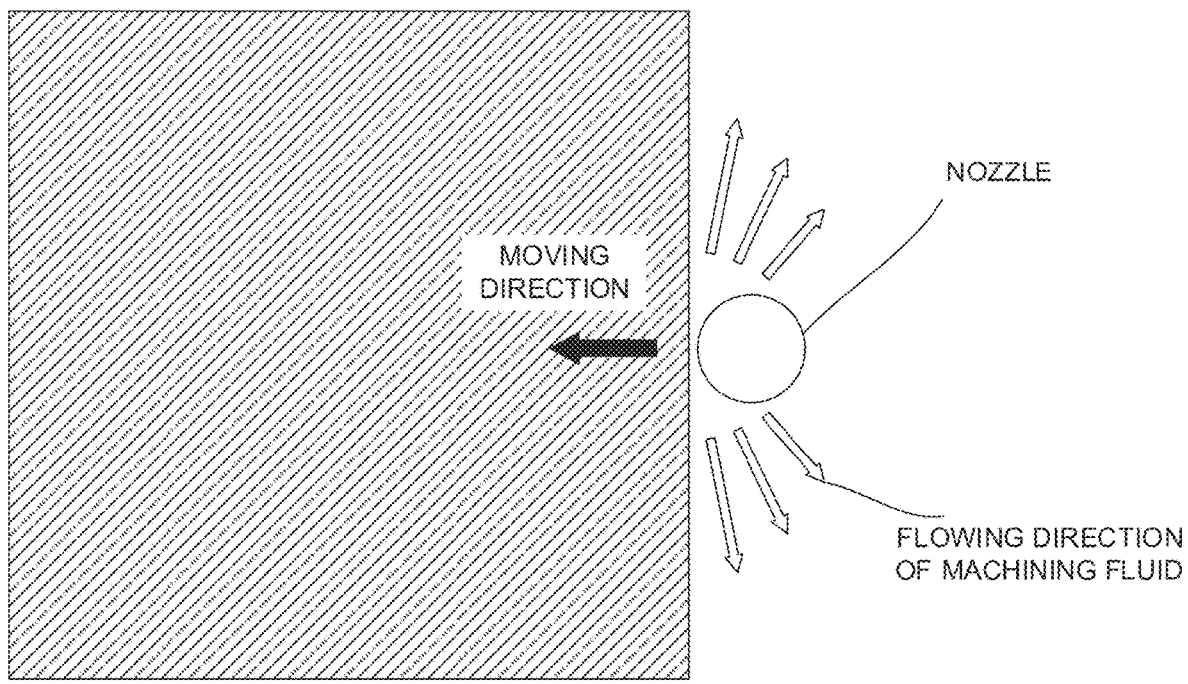
FIG. 10 is a diagram illustrating another example of the wire disconnection risk in the wire electric discharge machine.

When it is estimated that there is the possibility of the disconnection of the wire electrode 201, the estimation part 120 may not only estimate the disconnection cause but also estimate by how much adjustment of which machining condition the possibility of the disconnection of the wire electrode 201 is to be eliminated. For example, as illustrated in FIG. 7, when it is estimated that the state data Sa belongs to the same class set as the data acquired when the disconnection occurs under the condition of the high machining power, the estimation part 120 calculates by lowering how much of the machining condition (a machining voltage in the example of FIG. 7) relating to the machining power among the machining conditions the state data Sa can be made to belong to the same class as the data acquired when there is no disconnection. Then, the calculated result is estimated as a required adjustment amount of the machining condition.

● shows "STATE DATA ACQUIRED AT NORMAL TIME".

▲ shows "STATE DATA ACQUIRED WHEN DISCONNECTION OCCURS UNDER CONDITION OF SHORT ELECTRIC DISCHARGE SUSPENSION TIME".

■ shows "STATE DATA ACQUIRED WHEN DISCONNECTION OCCURS UNDER CONDITION OF SMALL MACHINING FLUID AMOUNT".

Δ shows "STATE DATA ACQUIRED WHEN DISCONNECTION OCCURS UNDER CONDITION OF HIGH MACHINING POWER".

○ shows "STATE DATA Sa OF ESTIMATION TARGET".

The result (estimation of the presence/absence of the possibility of the disconnection occurrence of the wire electrode 201 in the current machining state, and the cause when there is the possibility of the disconnection) estimated by the estimation part 120 may be displayed and outputted at the display device 70. In addition, the result may be transmitted and outputted through a cable/wireless network not illustrated to a fog computer or a cloud server or the like to be utilized. Based on the result estimated by the estimation part 120, the machining condition adjustment part 34 may change the machining condition of the wire electric discharge machine 2.

When "there is no possibility of the disconnection of the wire electrode 201" as the result estimated by the estimation part 120, the machining condition adjustment part 34 does not adjust the machining condition of the wire electric discharge machine 2. On the other hand, when "there is the possibility of the disconnection of the wire electrode 201" as the result estimated by the estimation part 120, the machining condition adjustment part 34 adjusts the machining condition of the wire electric discharge machine 2 so that the wire is not easily disconnected. For example, when the estimation part 120 estimates that the disconnection cause is the small machining fluid amount, the machining condition adjustment part 34 adjusts the machining condition so as to increase the machining fluid amount. When the estimation part 120 estimates that the disconnection cause is the short electric discharge suspension time, the machining condition is adjusted so as to prolong the electric discharge suspension time. When the estimation part 120 estimates the required adjustment amount of the machining condition, the machining condition adjustment part 34 may adjust the machining condition which is an adjustment target based on the estimated required adjustment amount of the machining condition.

In the wire disconnection prediction device 1 including the above-described configuration, based on the data acquired from the wire electric discharge machine 2, the estimation part 120 estimates the presence/absence of the possibility of the disconnection occurrence of the wire electrode 201 in the current machining state of the wire electric discharge machine 2, and estimates the cause when there is the possibility of the disconnection. Then, the machining condition of the wire electric discharge machine 2 is adjusted based on the estimation result so that the machining can be performed under the appropriate machining condition without the wire disconnection according to the machining state. Thus, since it is not needed to lower the machining condition in the same way even during an unmanned operation, the efficient wire electric discharge machining (the wire electric discharge machining for which the machining speed is maintained at a high speed in the range that the wire is not disconnected) can be performed.

While the one embodiment of the present invention is described above, the present invention is not limited only to the embodiments described above, and can be implemented in various aspects by adding appropriate changes.

For example, while the wire disconnection prediction device 1 and the machine learning device 300 are described as the devices including the different CPUs (processors) in the above-described embodiments, the machine learning device 300 may be achieved by the CPU 11 provided in the wire disconnection prediction device 1 and the system program stored in the ROM 12.

The above-described embodiments illustrate the example of mounting the wire disconnection prediction device 1 on the computer connected with the controller of the wire electric discharge machine 2 through the network 7. For example, mounting may be performed by appropriately changing arrangement of individual components such as mounting only a part of the machine learning device 300 on a host computer and mounting a main body of the wire disconnection prediction device 1 including the data acquisition part 30, the preprocessing part 32 and the machining condition change part 34 on an edge computer or the like.

The invention claimed is:

1. A wire disconnection prediction device for estimating a wire disconnection risk during machining of a workpiece in a wire electric discharge machine, the wire disconnection prediction device comprising:

a data acquisition part configured to acquire data relating to machining of the workpiece during machining of the workpiece by the wire electric discharge machine;

a preprocessing part configured to create, based on the data acquired by the data acquisition part, machining condition data of a condition relating to the machining commanded in the machining of the workpiece, machining member data relating to a member used in the machining, and machining state data during the machining of the workpiece, as state data indicating a state of the machining; and a machine learning device configured to execute, based on the state data created by the preprocessing part, processing relating to machine learning using a learning model indicating correlation between a machining state in the wire electric discharge machine and presence/absence of a possibility of disconnection occurrence of a wire electrode in the wire electric discharge machine and a disconnection cause by a plurality of class sets, wherein the preprocessing part is configured to create the state data and label data based on the data acquired by the data acquisition part, the label data taking, as label values, the presence/absence of the disconnection occurrence of the wire electrode at time when the state data is acquired and the disconnection cause at time when disconnection occurs, the machine learning device includes a learning part configured to generate the learning model, based on the state data and the label data, by creating the class sets corresponding to each of the label values taken by the label data, and the label data includes disconnection pattern data including a label indicating (1) presence/absence of disconnection occurrence of the wire electrode in a state where the state data is acquired and the disconnection cause estimated when the wire electrode is disconnected and (2) a machining condition adjusted before the disconnection, upon acquiring the data in the state where the wire electrode is not disconnected, the preprocessing part is configured to take a label value indicating that there is no disconnection, for the disconnection pattern data of the state data, and upon acquiring the data in the state right before the disconnection of the wire electrode, the preprocessing part is configured to take a label value indicating the disconnection occurrence and the machining condition adjusted before the disconnection, for the disconnection pattern data of the state data.

2. The wire disconnection prediction device according to claim 1, wherein the machine learning device includes:

a learning model storage part configured to store the learning model indicating the correlation between the machining state in the wire electric discharge machine and the presence/absence of the possibility of the disconnection occurrence of the wire electrode in the wire electric discharge machine and the disconnection cause by the plurality of class sets; and an estimation part configured to estimate, based on the state data created by the preprocessing part, the presence/absence of the possibility of the disconnection occurrence of the wire electrode in the wire electric discharge machine and the disconnection cause using the learning model stored in the learning model storage part.

3. The wire disconnection prediction device according to claim 2, wherein the estimation part is configured to estimate the presence/absence of the possibility of the disconnection occurrence of the wire electrode in the wire electric discharge machine and the disconnection cause, by k-nearest neighbor algorithm using the state data created by the preprocessing part and the plurality of class sets in the learning model.

4. The wire disconnection prediction device according to claim 3, further comprising a machining condition adjustment part configured to change a machining condition of the wire electric discharge machine, based on an estimation result of the estimation part.

5. The wire disconnection prediction device according to claim 1, wherein the machine learning device is configured to (1) generate the learning model obtained by gathering the state data for which the disconnection pattern data takes the same label value as respectively different class sets, and (2) store the generated learning model in a learning model storage part.

* * * * *